US012571644B2

(12) United States Patent
Singh et al.

(10) Patent No.: US 12,571,644 B2
(45) Date of Patent: Mar. 10, 2026

(54) PROVIDING ROUTE NAVIGATION RECOMMENDATIONS

(71) Applicant: International Business Machines Corporation, Armonk, NY (US)

(72) Inventors: Rakshit Singh, New Delhi (IN); Sanmitra Sarkar, Kolkata (IN); Richa Manral, Haldwani (IN)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 18/403,881

(22) Filed: Jan. 4, 2024

(65) Prior Publication Data

US 2025/0224247 A1 Jul. 10, 2025

(51) Int. Cl.
*G01C 21/36* (2006.01)
*G01C 21/34* (2006.01)
*G06Q 30/0251* (2023.01)

(52) U.S. Cl.
CPC ..... *G01C 21/3697* (2013.01); *G01C 21/3484* (2013.01); *G06Q 30/0271* (2013.01)

(58) Field of Classification Search
CPC ............ G01C 21/3697; G01C 21/3484; G06Q 30/0271
See application file for complete search history.

(56) References Cited

U.S. PATENT DOCUMENTS 8,335,524 B2 12/2012 Shutter
8,554,611 B2 10/2013 Roberts et al.
8,719,094 B1 5/2014 Klein et al.
8,943,037 B2 1/2015 Droznin et al.
9,261,374 B2 2/2016 Mundinger et al.
10,371,536 B2 8/2019 König et al.
(Continued)

FOREIGN PATENT DOCUMENTS

CN 107003141 B 7/2020
KR 20170126029 A 11/2017

OTHER PUBLICATIONS

"Location-Based Advertising Market", https://straitsresearch.com/report/location-based-advertising-market#:~:text=The%20global%20location%2Dbased%20advertising,USD%2069.69%20billion%20in%202021, (Retrieved: Jan. 4, 2024), 6 pages.

(Continued)

*Primary Examiner* — Anne Marie Antonucci
(74) *Attorney, Agent, or Firm* — Cantor Colburn LLP; Robert D. Bean

(57) ABSTRACT

Embodiments include providing route navigation recommendations that include user configurable advertisements. Aspects of the invention include receiving an origin, a destination, and a route deviation tolerance, obtaining a set of advertisements based on the origin, the destination, and the route deviation tolerance, and generating a plurality of routes from the origin to the destination. Aspects also include calculating, for each of the plurality of routes, a total monetary benefit and transmitting, to a user, the plurality of routes, an indication of an expected duration to traverse each of the plurality of routes, and the total monetary benefit of each of the plurality of routes. Aspects further include receiving a selected route from the one of the plurality of routes, monitoring a movement of the user along the selected route, and transmitting to the user the advertisement corresponding to the checkpoint.

20 Claims, 6 Drawing Sheets

(56)                    References Cited

U.S. PATENT DOCUMENTS

| | | | |
|---|---|---|---|
| 10,462,259 B2 | 10/2019 | Agarwal et al. | |
| 11,023,930 B2 | 6/2021 | Wills | |
| 2007/0156326 A1 | 7/2007 | Nesbitt | |
| 2007/0208623 A1 | 9/2007 | Worden et al. | |
| 2007/0210937 A1 | 9/2007 | Smith et al. | |
| 2008/0091341 A1* | 4/2008 | Panabaker | G06Q 10/10 |
| | | | 701/533 |
| 2008/0154714 A1 | 6/2008 | Liu et al. | |
| 2009/0210302 A1 | 8/2009 | Tashev et al. | |
| 2011/0040626 A1 | 2/2011 | Lin | |
| 2014/0304076 A1 | 10/2014 | Baca et al. | |
| 2015/0285652 A1* | 10/2015 | Peri | G01C 21/3476 |
| | | | 701/438 |
| 2016/0092932 A1* | 3/2016 | Bharath | G10L 13/00 |
| | | | 705/14.67 |

OTHER PUBLICATIONS

Cheng , Xi. "A travel route recommendation algorithm based on interest theme and distance matching." Journal on Advances in Signal Processing. Published Date: Aug. 3, 2021. 10 Pages.
Sun, et al, "Multi-Objective Optimal Travel Route Recommendation for Tourists by Improved Ant Colony Optimization Algorithm", Hindawi, Journal of Advanced Transportation, 2022, 14 pages.

* cited by examiner

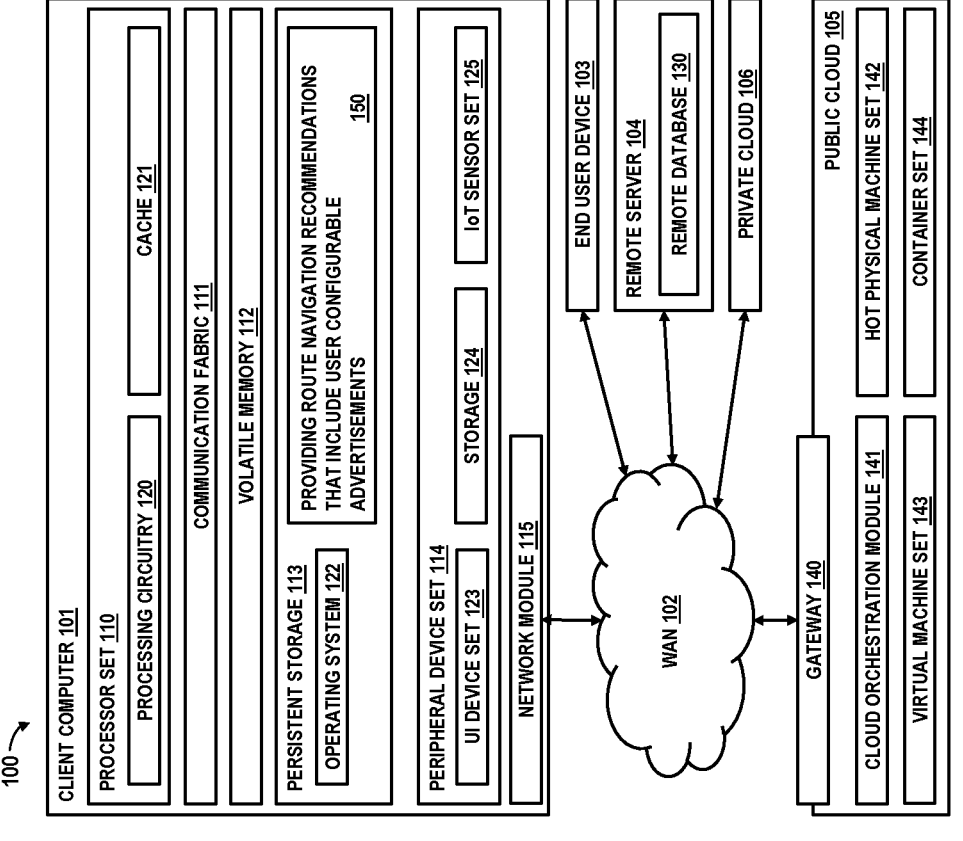

CLIENT COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122

PROVIDING ROUTE NAVIGATION RECOMMENDATIONS THAT INCLUDE USER CONFIGURABLE ADVERTISEMENTS    150

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOT PHYSICAL MACHINE SET 142

VIRTUAL MACHINE SET 143    CONTAINER SET 144

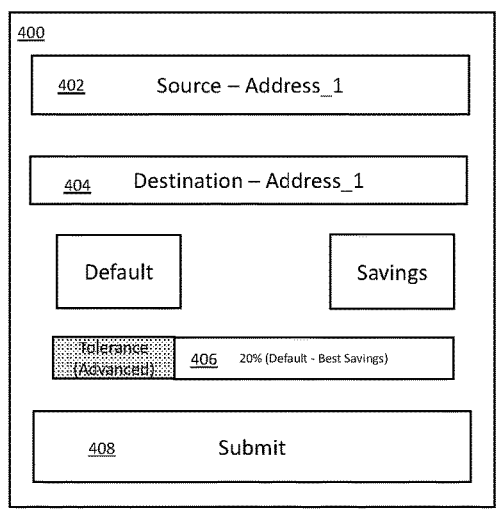

400

| 402 | Source – Address_1 |

| 404 | Destination – Address_1 |

| Default | | Savings |

| Tolerance (Advanced) | 406 | 20% (Default - Best Savings) |

| 408 | Submit |

FIG. 4A

401     Routes Recommended

Address_1 to Address_2
ETA: 13mins
Savings/Summary: Rs.0/-     410-1
Checkpoints:1

Get Directions     412

View Promos     414

Address_1 to Address_2
ETA: 16mins
Savings/Summary: Rs.250/-
Checkpoints:3     410-2

Get Directions

View Promos

Address_1 to Address_2
ETA: 35mins
Savings/Summary: Rs.500/- and 10% of on next purchase
of Virat Kohli pumar merchandise
Checkpoints:7     410-3

Get Directions

View Promos

FIG. 4B

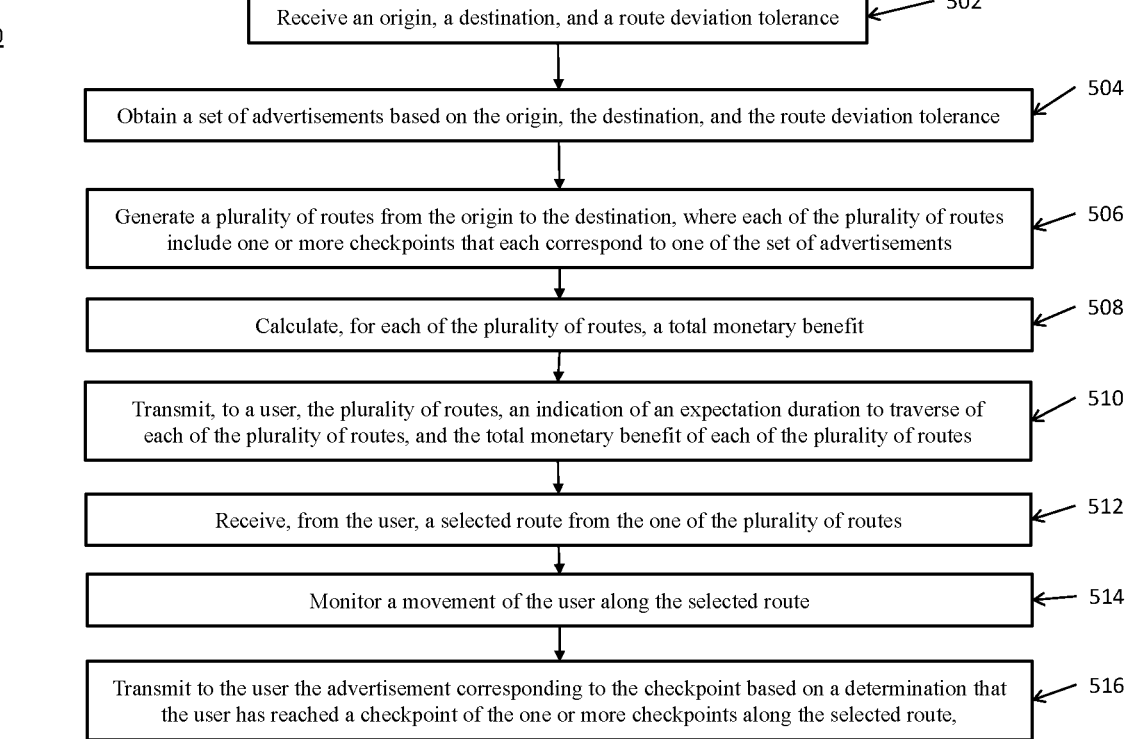

500

Receive an origin, a destination, and a route deviation tolerance — 502

Obtain a set of advertisements based on the origin, the destination, and the route deviation tolerance — 504

Generate a plurality of routes from the origin to the destination, where each of the plurality of routes include one or more checkpoints that each correspond to one of the set of advertisements — 506

Calculate, for each of the plurality of routes, a total monetary benefit — 508

Transmit, to a user, the plurality of routes, an indication of an expectation duration to traverse of each of the plurality of routes, and the total monetary benefit of each of the plurality of routes — 510

Receive, from the user, a selected route from the one of the plurality of routes — 512

Monitor a movement of the user along the selected route — 514

Transmit to the user the advertisement corresponding to the checkpoint based on a determination that the user has reached a checkpoint of the one or more checkpoints along the selected route, — 516

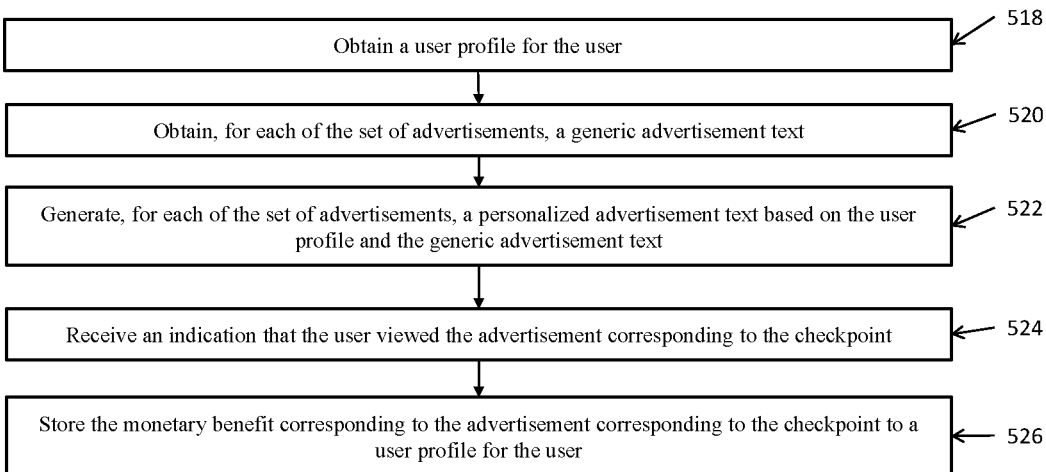

Obtain a user profile for the user — 518

Obtain, for each of the set of advertisements, a generic advertisement text — 520

Generate, for each of the set of advertisements, a personalized advertisement text based on the user profile and the generic advertisement text — 522

Receive an indication that the user viewed the advertisement corresponding to the checkpoint — 524

Store the monetary benefit corresponding to the advertisement corresponding to the checkpoint to a user profile for the user — 526

FIG. 5B

PROVIDING ROUTE NAVIGATION RECOMMENDATIONS

BACKGROUND

The present invention generally relates to providing route navigation recommendations, and more specifically, to providing route navigation recommendations that include user configurable advertisements.

The use of navigational systems to provide drivers with turn-by-turn route navigation instructions has drastically increased and multiple different route recommendation and guidance systems have been developed. In addition, advancements in advertising techniques have led to a rising demand for the integration of advertisements into route recommendation and guidance systems. However, traditional advertising methods often fail to deliver relevant and engaging content to users, bombarding them with disruptive and irrelevant advancements that do not capture their attention effectively.

SUMMARY

Embodiments of the present invention are directed to providing route navigation recommendations that include user configurable advertisements. A non-limiting example computer-implemented method includes receiving an origin, a destination, and a route deviation tolerance, obtaining a set of advertisements based on the origin, the destination, and the route deviation tolerance, wherein each of the set of advertisements includes a monetary benefit, and generating a plurality of routes from the origin to the destination, wherein each of the plurality of routes includes one or more checkpoints that each correspond to one of the set of advertisements. The method also includes calculating, for each of the plurality of routes, a total monetary benefit and transmitting, to a user, the plurality of routes, an indication of an expected duration to traverse each of the plurality of routes, and the total monetary benefit of each of the plurality of routes. The method further includes receiving, from the user, a selected route from the one of the plurality of routes, monitoring a movement of the user along the selected route, and transmitting to the user the advertisement corresponding to the checkpoint based on a determination that the user has reached a checkpoint of the one or more checkpoints along the selected route.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 1 is a block diagram of an example computer system for use in conjunction with one or more embodiments of the present disclosure;

FIGS. 4A and 4B are schematic diagrams of user interfaces for providing route navigation recommendations that include user configurable advertisements according to one or more embodiments of the disclosure; and FIGS. 5A and 5B are flowchart diagrams illustrating a method for providing route navigation recommendations that include user configurable advertisements according to one or more embodiments of the disclosure.

Figure 2:
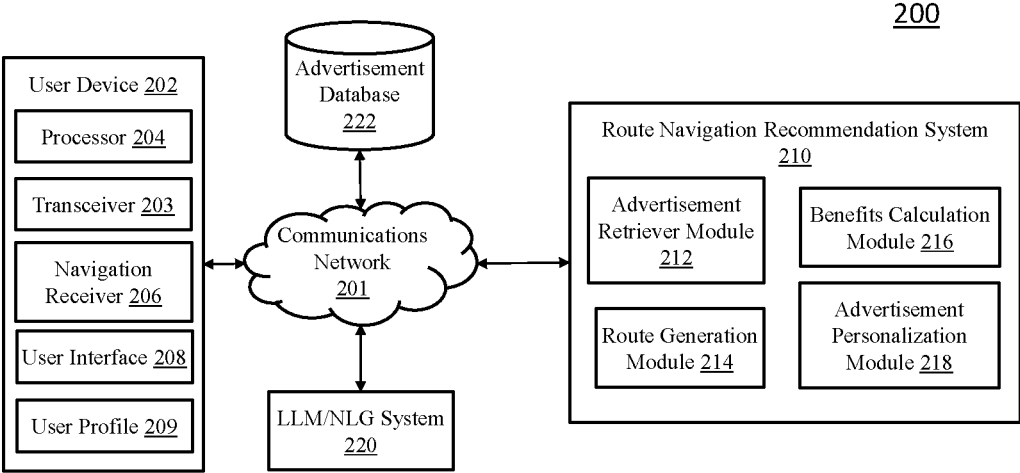
FIG. 2 is a block diagram of a system for providing route navigation recommendations that include user configurable advertisements according to one or more embodiments of the disclosure.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

As discussed above, advancements in advertising techniques have led to a rising demand for the integration of advertisements into route recommendation and guidance systems. However, traditional advertising methods often fail to deliver relevant and engaging content to users, bombarding them with disruptive and irrelevant advancements that do not capture their attention effectively.

Embodiments of the disclosure include methods, systems, and computer program products for providing route navigation recommendations that include user configurable advertisements. In exemplary embodiments, a route navigation recommendation system is configured to receive an origin, a destination, and a route deviation tolerance from the user, where the route deviation tolerance indicates one or more of an additional distance or additional time that the user is willing to travel above a most direct or fastest route. Based on the origin, the destination, and the route deviation tolerance, the route navigation recommendation system is configured to obtain a set of advertisements that each includes a monetary benefit to the user and to generate a plurality of routes from the origin to the destination, where each route includes one or more checkpoints that each correspond to one of the sets of advertisements.

In exemplary embodiments, the route navigation recommendation system is also configured to calculate, for each of the plurality of routes, a total monetary benefit and to transmit, to a user, the plurality of routes, an indication of an expected duration to traverse each of the plurality of routes, and the total monetary benefit of each of the plurality of routes. After receiving, from the user, a selected route from one of the plurality of routes, the route navigation recommendation system is also configured to monitor the movement of the user along the selected route and to transmit to the user the advertisement corresponding to the checkpoint, based on a determination that the user has reached a checkpoint of the one or more checkpoints along the selected route.

In exemplary embodiments, the advertisements provided to the user include personalized advertisement text that is generated based on a user profile for the user and on a generic advertisement text for the advertisement. The personalized advertisement text can be generated by prompting a trained large language model to create a personalized advertisement text for the user associated with the user profile based on the generic advertisement text.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as providing route navigation recommendations that include user configurable advertisements, as shown at block 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

One or more embodiments described herein can utilize machine learning techniques to perform prediction and or classification tasks, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Referring now to FIG. 2, a block diagram of a system 200 for providing route navigation recommendations that include user configurable advertisements according to one or more embodiments of the disclosure is shown. As illustrated, the system 200 includes a user device 202 that is in communication with a route navigation recommendation system 210 via communications network 201. The user device 202 may be a smartphone, a tablet, an in-vehicle navigation system, or the like. The communications network 201 may include a combination of public and private networks, such as a cellular communications network, a WiFi network, and/or the Internet. In exemplary embodiments, the route navigation recommendation system 210 is configured to communicate with one or more of an advertisement database 222 and a large language model (LLM)/natural language generation (NLG) system 220.

In exemplary embodiments, the user device 202 includes a processor 204, a transceiver 203, a navigation receiver 206, a user interface 208, and a user profile 209. In exemplary embodiments, the processor 204 is configured to communicate with the communications network 201 via the transceiver 203. The user interface 208 is configured to receive input from a user, such as receiving an origin, a destination, and a route deviation tolerance, and to display route recommendations, advertisements, and turn-by-turn directions to the user. The navigation receiver 206 is configured to receive positional signals from a navigation system, such as a global positioning system (GPS).

In exemplary embodiments, the route navigation recommendation system 210 includes an advertisement retriever module 212, a route generation module 214, a benefits calculation module 216, and an advertisement personalization module 218. In exemplary embodiments, the route navigation recommendation system 210 may be embodied in a computer 101, such as the one shown in FIG. 1.

In exemplary embodiments, the advertisement retriever module 212 is configured to obtain generic advertisements from an advertisement database 222. In one embodiment, the advertisement retriever module 212 is configured to obtain advertisements that are relevant to a geographic region that includes one or more of the origin and the destination provided by a user device 202. In addition, the advertisement retriever module 212 is configured to obtain advertisements that are relevant to the user profile 209 of the user. In exemplary embodiments, each of the advertisements obtained by the advertisement retriever module 212 from the advertisement database 222 includes a generic advertisement text and a monetary benefit associated with the advertisements. In one embodiment, each advertisement also includes one or more geographic locations associated with the advertisement, the one or more geographic locations associated may correspond to checkpoint locations that can be specified by the creator of the advertisement.

In exemplary embodiments, the route generation module 214 is configured to receive the origin, the destination, and the route deviation tolerance provided by a user device 202 and to responsively generate a plurality of routes from the origin to the destination that comply with the route deviation tolerance. For example, the route generation module 214 may first calculate the best route from the origin to the destination that has the shortest expected travel duration or the shortest distance. Next, the route generation module 214 identifies a plurality of additional routes that have a longer expected travel duration or distance that complies with the user-provided route deviation tolerance. In exemplary embodiments, each of the plurality of routes includes one or more checkpoints along the route and each of the checkpoints is associated with an advertisement received from the advertisement retriever module 212.

In exemplary embodiments, the benefits calculation module 216 is configured to obtain each of the plurality of routes from the origin to the destination and identify each of the checkpoints along the routes and advertisements corresponding to the checkpoints. In addition, the benefits calculation module 216 is configured to calculate a total monetary benefit for each of the plurality of routes by adding up the monetary benefit of each advertisement that will be presented along the route.

In exemplary embodiments, the advertisement personalization module 218 is configured to communicate with an LLM/NLG system 220 to generate personalized advertisement text. In one embodiment, the personalized advertisement text is generated based on the user profile 209 and on a generic advertisement text for the advertisement, which are received from the advertisement database 222. The personalized advertisement text can be generated by prompting the LLM/NLG system 220 to create a personalized advertisement text for the user associated with the user profile based on the generic advertisement text.

Figure 3:
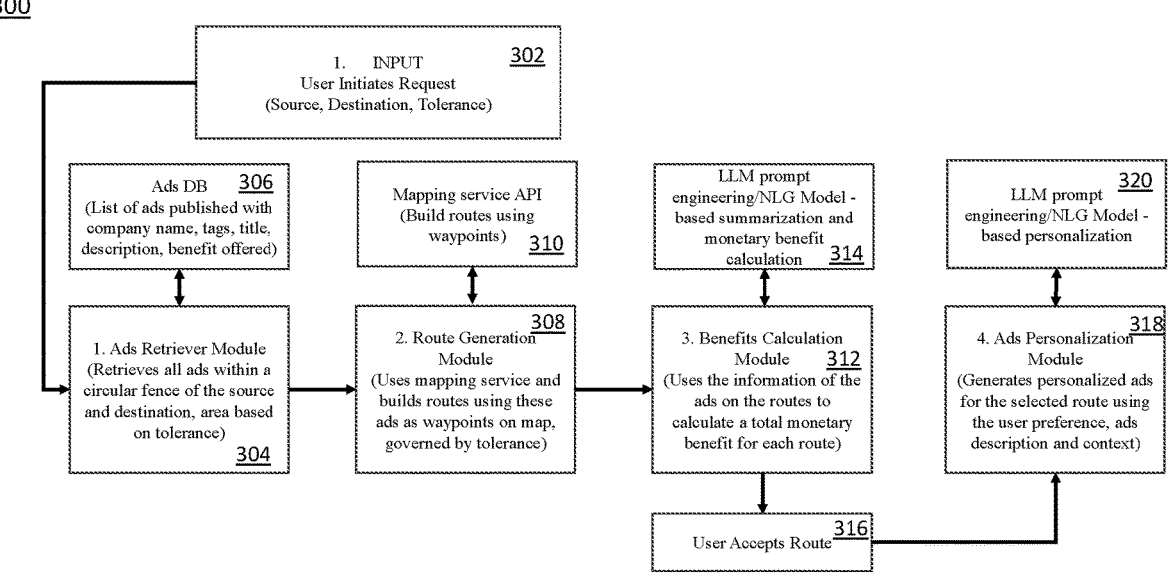
FIG. 3 is a block diagram of a process flow for providing route navigation recommendations that include user configurable advertisements according to one or more embodiments of the disclosure.

Referring now to FIG. 3, a block diagram of a process flow 300 for providing route navigation recommendations that include user configurable advertisements according to one or more embodiments of the disclosure is shown. As shown at block 302, the process flow 300 begins by receiving input from a user for obtaining route navigation recommendations. The input includes an origin, a destination, and a route deviation tolerance. In one embodiment, the origin is determined to be the current location of a user. In another embodiment, the user specifies the origin location. Next, at block 304, the process flow 300 includes the advertisement retriever module retrieving all ads within a circular fence of the source and destination, area based on tolerance from an advertisement database, shown at block 306. In exemplary embodiments, the advertisement database includes a plurality of advertisements that each include a company name, one or more relevance tags, a title, a description, a monetary benefit offered, and one or more geo-locations associated with the advertisement.

As shown at block 312, the process flow 300 includes the benefits calculation module using the information obtained from the advertisements corresponding to each of the routes to calculate a total monetary benefit for each route. In exemplary embodiments, as shown at block 314, an LLM/NLG system can be utilized to create a textual summary of the benefits associated with the advertisements for each route. At block 316, a user selects one of the plurality of recommended routes. Next, at block 318, the process flow 300 includes the advertisement personalization module generating personalized advertisement text for advertisements along a user-selected route using the user profile and a generic advertisement text. In one embodiment, as shown at block 320, an LLM/NLG system can be utilized by the advertisement personalization module to create personalized advertisement text.

Referring now to FIGS. 4A and 4B, schematic diagrams of user interfaces 400, 401 for providing route navigation recommendations that include user configurable advertisements according to one or more embodiments of the disclosure are shown. The user interface 400, as shown in FIG. 4A, is configured to receive input from a user. The user interface 401 includes a first user input field 402 that is configured to receive an origin location, a second user input field 404 that is configured to receive a destination location, and a third user input field 406 that is configured to receive a route deviation tolerance. In addition, the user interface 401 includes an element 408 that is configured to transmit a route navigation recommendations request to the navigation recommendation system. The user interface 401, as shown in FIG. 4B, is configured to display a plurality of routes 410-1, 410-2, 401-3, referred to collectively herein as routes 410, generated by the route navigation recommendations to a user. As illustrated, each route 410 displayed includes an estimated travel time along the route, a number of checkpoints along the route, and a summary of the savings, or total monetary benefit, associated with the route 410. In exemplary embodiments, a user can select a route and begin receiving turn-by-turn directions by clicking on the get directions icon 412. In addition, a user can preview each of the advertisements that will be presented along the route by clicking on the view promos icon 414.

Referring now to FIGS. 5A and 5B, a flowchart diagram illustrating a method 500 for providing route navigation recommendations that include user configurable advertisements according to one or more embodiments of the disclosure is shown. The method 500 begins at block 502 by receiving an origin, a destination, and a route deviation tolerance. In exemplary embodiments, one or more of the origin, the destination, and the route deviation tolerance are received from a user via a user interface of a user device. Next, as shown at block 504, the method 500 includes obtaining a set of advertisements based on the origin, the destination, and the route deviation tolerance. In exemplary embodiments, each of the set of advertisements includes a monetary benefit and one or more geographic locations that are specified by the creator of the advertisement. The one or more geographic locations correspond to locations that the creator of the advertisement would like for the advertisement to be presented to a user and the monetary benefit may include a discount, coupon, or credit that is provided to a user that views the advertisement.

As shown at block 506, the method 500 includes generating a plurality of routes from the origin to the destination, where each of the plurality of routes includes one or more checkpoints that each correspond to one of the set of advertisements. In exemplary embodiments, the checkpoints may correspond to one of the geographic locations specified by the advertisement. Next, as shown at block 504, the method 500 includes calculating, for each of the plurality of routes, a total monetary benefit. In one embodiment, the total monetary benefit is the sum of the monetary benefits associated with each of the advertisements that will be presented to a user along a route. The method 500 also includes transmitting, to a user, the plurality of routes, an indication of an expected duration to traverse each of the plurality of routes, and the total monetary benefit of each of the plurality of routes, as shown at block 510.

The method 500 also includes receiving, from the user, a selected route from the one of the plurality of routes, as shown at block 512. In exemplary embodiments, once a selected route is identified by a user, the user device is configured to present turn-by-turn navigational directions to traverse the selected route to the user. Next, as shown at block 514, the method 500 includes monitoring the movement of the user along the selected route. The method 500 also includes transmitting to the user the advertisement corresponding to a checkpoint based on a determination that the user has reached the checkpoint of the one or more checkpoints along the selected route, as shown at block 516.

In exemplary embodiments, the method 500 also includes obtaining a user profile for the user, as shown at block 518. In exemplary embodiments, the user profile is obtained from a user device of the user and includes demographic information regarding the user. Next, as shown at block 520, the method 500 includes obtaining, for each of the set of advertisements, a generic advertisement text. The method 500 also includes generating, for each of the set of advertisements, a personalized advertisement text based on the user profile and the generic advertisement text, as shown at block 522.

In exemplary embodiments, the method 500 also includes receiving an indication that the user viewed the advertisement corresponding to the checkpoint, as shown at block 524. In one embodiment, the indication that the user viewed the advertisement corresponding to the checkpoint corresponding to the checkpoint is generated by a user clicking acknowledging the advertisement corresponding to the checkpoint within a threshold amount of time after the advertisement corresponding to the checkpoint is presented to the user. In another embodiment, the indication that the user viewed the advertisement corresponding to the checkpoint corresponding to the checkpoint is generated by observing that the user looked at the advertisement. Next, as shown at block 526, the method 500 includes storing the monetary benefit corresponding to the advertisement corresponding to the checkpoint to a user profile for the user.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/ connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of #8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for providing route navigation recommendations that include user configurable advertisements, the method comprising:

receiving, from a user via a user interface of a user device, an origin, a destination, and a route deviation tolerance;

generating a geo-hash of the origin and a geo-hash of the destination;

obtaining, by a processor, a set of advertisements from an advertisement database, wherein each advertisement includes a monetary benefit and one or more geographic locations specified by a creator of the advertisement, the one or more geographic locations corresponding to locations that the creator of the advertisement would like for the advertisement to be presented to a user;

for each advertisement in the advertisement database, determining whether a checkpoint location associated with the advertisement is reachable by a route from the origin to the destination that deviates from a most direct or fastest route by no more than the route deviation tolerance, and including the advertisement in the set of advertisements only if the checkpoint location is reachable within the route deviation tolerance;

generating a plurality of routes from the origin to the destination, wherein each of the plurality of routes includes one or more checkpoints that each correspond to one of the set of advertisements;

calculating, for each of the plurality of routes, a total monetary benefit;

transmitting, to a user, the plurality of routes, an indication of an expected duration to traverse each of the plurality of routes, and the total monetary benefit of each of the plurality of routes;

receiving, from the user, a selected route from the one of the plurality of routes;

monitoring a movement of the user along the selected route by receiving positional signals from a navigation receiver; and based on a determination, by the navigation receiver, that the user has reached a checkpoint of the one or more checkpoints along the selected route, transmitting to the user the advertisement corresponding to the checkpoint, wherein obtaining the set of advertisements comprises matching the geo-hash of the origin and the geo-hash of the destination to geo-hash information associated with each advertisement to identify advertisements relevant to a geographic region of the origin and the destination.

2. The method of claim 1, further comprising:

obtaining a user profile for the user;

obtaining, for each of the set of advertisements, a generic advertisement text;

generating, for each of the set of advertisements, a personalized advertisement text based on the user profile and the generic advertisement text, wherein the advertisement corresponding to the checkpoint transmitted to the user includes the personalized advertisement text.

3. The method of claim 2, wherein the personalized advertisement text is generated by inputting the user profile and the generic advertisement text into a large language model.

4. The method of claim 1, further comprising receiving an indication that the user viewed the advertisement corresponding to the checkpoint.

5. The method of claim 4, wherein the indication that the user viewed the advertisement corresponding to the checkpoint corresponding to the checkpoint is generated by a user clicking acknowledging the advertisement corresponding to the checkpoint within a threshold amount of time after the advertisement corresponding to the checkpoint is presented to the user.

6. The method of claim 4, further comprising storing the monetary benefit corresponding to the advertisement corresponding to the checkpoint to a user profile for the user.

7. The method of claim 1, further comprising:

obtaining a user profile for the user;

obtaining, for each of the set of advertisements, a generic advertisement text;

generating, for each of the set of advertisements, a personalized advertisement text based on the user profile and the generic advertisement text, wherein the personalized advertisement text is generated by prompting a large language model to create a personalized advertisement text for the user associated with the user profile based on the generic advertisement text, and wherein the advertisement corresponding to the checkpoint transmitted to the user includes the personalized advertisement text.

8. The method of claim 1, further comprising providing, via a user interface, a preview of each advertisement that will be presented along the selected route prior to the user beginning traversal of the selected route.

9. A system comprising:

a memory having computer readable instructions; and one or more processors for executing the computer readable instructions, the computer readable instructions controlling the one or more processors to perform operations comprising:

receiving, from a user via a user interface of a user device, an origin, a destination, and a route deviation tolerance;

generating a geo-hash of the origin and a geo-hash of the destination;

obtaining a set of advertisements from an advertisement database, wherein each advertisement includes a monetary benefit and one or more geographic locations specified by a creator of the advertisement, the one or more geographic locations corresponding to locations that the creator of the advertisement would like for the advertisement to be presented to a user;

for each advertisement in the advertisement database, determining whether a checkpoint location associated with the advertisement is reachable by a route from the origin to the destination that deviates from a most direct or fastest route by no more than the route deviation tolerance, and including the advertisement in the set of advertisements only if the checkpoint location is reachable within the route deviation tolerance;

generating a plurality of routes from the origin to the destination, wherein each of the plurality of routes includes one or more checkpoints that each correspond to one of the set of advertisements;

calculating, for each of the plurality of routes, a total monetary benefit;

transmitting, to a user, the plurality of routes, an indication of an expected duration to traverse each of the plurality of routes, and the total monetary benefit of each of the plurality of routes;

receiving, from the user, a selected route from the one of the plurality of routes;

monitoring a movement of the user along the selected route by receiving positional signals from a navigation receiver; and based on a determination, by the navigation receiver, that the user has reached a checkpoint of the one or more checkpoints along the selected route, transmitting to the user the advertisement corresponding to the checkpoint, wherein obtaining the set of advertisements comprises matching the geo-hash of the origin and the geo-hash of the destination to geo-hash information associated with each advertisement to identify advertisements relevant to a geographic region of the origin and the destination.

10. The system of claim 9, wherein the operations further comprise:

obtaining a user profile for the user;

obtaining, for each of the set of advertisements, a generic advertisement text;

generating, for each of the set of advertisements, a personalized advertisement text based on the user profile and the generic advertisement text, wherein the advertisement corresponding to the checkpoint transmitted to the user includes the personalized advertisement text.

11. The system of claim 10, wherein the personalized advertisement text is generated by inputting the user profile and the generic advertisement text into a large language model.

12. The system of claim 9, wherein the operations further comprise receiving an indication that the user viewed the advertisement corresponding to the checkpoint.

13. The system of claim 12, wherein the indication that the user viewed the advertisement corresponding to the checkpoint corresponding to the checkpoint is generated by a user clicking acknowledging the advertisement corresponding to the checkpoint within a threshold amount of time after the advertisement corresponding to the checkpoint is presented to the user.

14. The system of claim 12, wherein the operations further comprise storing the monetary benefit corresponding to the advertisement corresponding to the checkpoint to a user profile for the user.

15. A computer program product comprising a computer readable storage medium having program instructions embodied therewith, the program instructions executable by a processor to cause the processor to perform operations comprising:

receiving, from a user via a user interface of a user device, an origin, a destination, and a route deviation tolerance;

generating a geo-hash of the origin and a geo-hash of the destination;

obtaining a set of advertisements from an advertisement database, wherein each advertisement includes a monetary benefit and one or more geographic locations specified by a creator of the advertisement, the one or more geographic locations corresponding to locations that the creator of the advertisement would like for the advertisement to be presented to a user;

for each advertisement in the advertisement database, determining whether a checkpoint location associated with the advertisement is reachable by a route from the origin to the destination that deviates from a most direct or fastest route by no more than the route deviation tolerance, and including the advertisement in the set of advertisements only if the checkpoint location is reachable within the route deviation tolerance;

generating a plurality of routes from the origin to the destination, wherein each of the plurality of routes includes one or more checkpoints that each correspond to one of the set of advertisements;

calculating, for each of the plurality of routes, a total monetary benefit;

transmitting, to a user, the plurality of routes, an indication of an expected duration to traverse each of the plurality of routes, and the total monetary benefit of each of the plurality of routes;

receiving, from the user, a selected route from the one of the plurality of routes;

monitoring a movement of the user along the selected route by receiving positional signals from a navigation receiver; and based on a determination, by the navigation receiver, that the user has reached a checkpoint of the one or more checkpoints along the selected route, transmitting to the user the advertisement corresponding to the checkpoint wherein obtaining the set of advertisements comprises matching the geo-hash of the origin and the geo-hash of the destination to geo-hash information associated with each advertisement to identify advertisements relevant to a geographic region of the origin and the destination.

16. The computer program product of claim 15, wherein the operations further comprise:

obtaining a user profile for the user;

obtaining, for each of the set of advertisements, a generic advertisement text;

generating, for each of the set of advertisements, a personalized advertisement text based on the user profile and the generic advertisement text, wherein the advertisement corresponding to the checkpoint transmitted to the user includes the personalized advertisement text. 5

17. The computer program product of claim 16, wherein the personalized advertisement text is generated by inputting the user profile and the generic advertisement text into a large language model. 10

18. The computer program product of claim 15, wherein the operations further comprise receiving an indication that the user viewed the advertisement corresponding to the checkpoint.

19. The computer program product of claim 18, wherein 15 the indication that the user viewed the advertisement corresponding to the checkpoint corresponding to the checkpoint is generated by a user clicking acknowledging the advertisement corresponding to the checkpoint within a threshold amount of time after the advertisement corresponding to the 20 checkpoint is presented to the user.

20. The computer program product of claim 18, wherein the operations further comprise storing the monetary benefit corresponding to the advertisement corresponding to the checkpoint to a user profile for the user. 25

\*  \*  \*  \*  \*